(12) United States Patent
Villinger

(10) Patent No.: US 6,293,490 B1
(45) Date of Patent: Sep. 25, 2001

(54) AIRCRAFT

(76) Inventor: Markus Villinger, Gagers 45, A-6165 Telfes (AT)

( * ) Notice: Subject to any disclaimer, the term of this patent is extended or adjusted under 35 U.S.C. 154(b) by 0 days.

(21) Appl. No.: 09/447,647

(22) Filed: Nov. 22, 1999

(30) Foreign Application Priority Data

Nov. 20, 1998 (AT) .................................................... 1938/98
Feb. 12, 1999 (AT) .................................................... 201/99

(51) Int. Cl.⁷ .............................. B64C 31/02; F42B 10/00
(52) U.S. Cl. .................................................. 244/16; 244/900
(58) Field of Search ................................ 244/16, 64, 900

(56) References Cited

U.S. PATENT DOCUMENTS 5,252,068    10/1993    Gryder ................................... 434/30

FOREIGN PATENT DOCUMENTS

| 36 02 407 | 11/1986 | (DE) | ............................. B64C/31/02 |
| WO 88/06550 | 2/1992 | (EP) | ............................. B64C/31/02 |
| 2535285 A1 | 5/1984 | (FR) | ............................. B64C/39/00 |

Primary Examiner—Charles T. Jordan
Assistant Examiner—G. Steele
(74) Attorney, Agent, or Firm—Lorusso & Loud

(57) ABSTRACT

Aircraft, in particular a hang-glider, with a flexible wing and a pilot's position preferably arranged beneath it, from which space the aircraft can be controlled, wherein the trailing edge of the flexible wing can be locally raised and/or lowered by means of a transmission means leading from said trailing edge to the pilot's space.

16 Claims, 11 Drawing Sheets

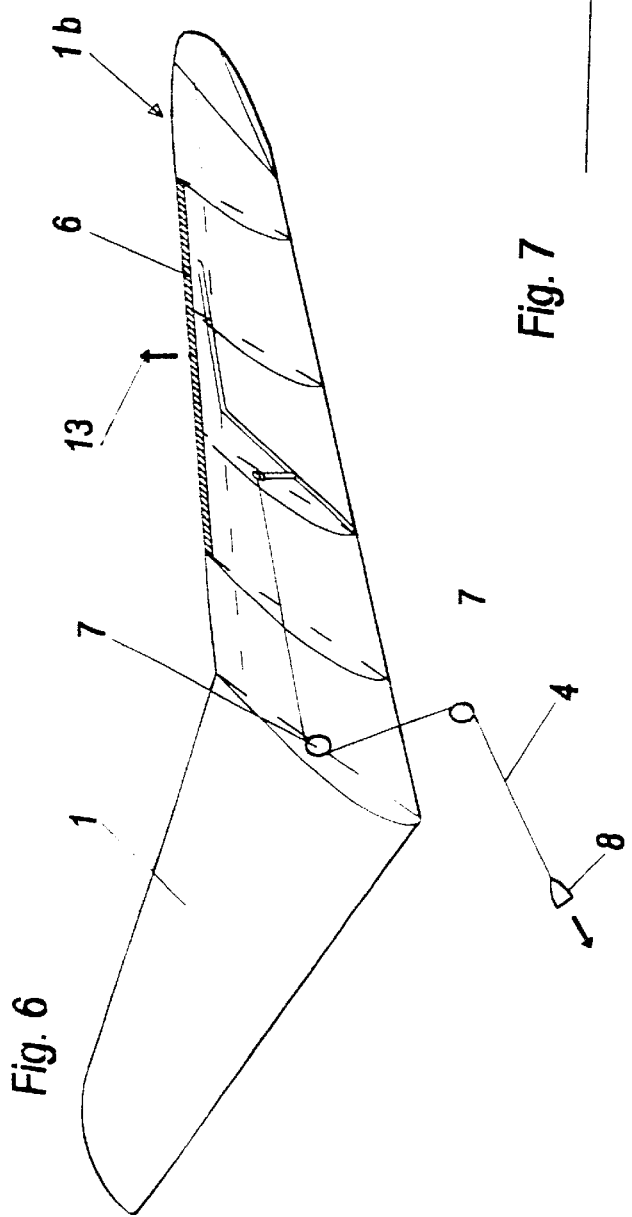
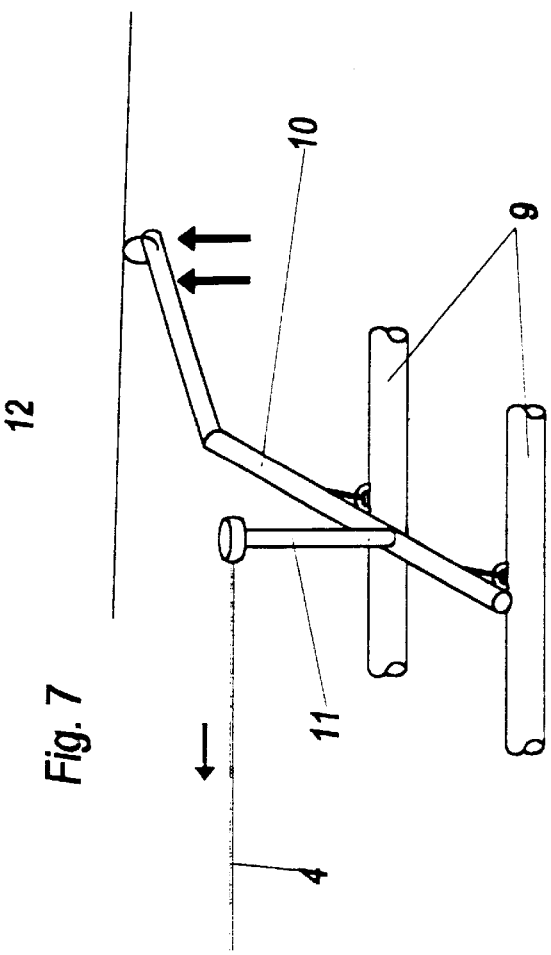
Fig. 6
Fig. 7

AIRCRAFT

BACKGROUND OF THE INVENTION

The invention relates to an aircraft, in particular a hang-glider with a flexible wing, and a space for a pilot, preferably arranged beneath it, from which space the aircraft can be controlled.

Such aircraft, or respectively hang-gliders (Rogallo wing) have been used for a long time. Normally, a wing made from flexible material stretches rearwards from a rigid wing nose, said wing being braced to a tubular frame of the hang-glider by means of cables. The controlling, or respectively steering of such an aircraft or respectively hang-glider is done by shifting the weight of the pilot, who hangs beneath the wing.

The object of the invention is to provide improved control for an aircraft, in particular a hang-glider of the type described in the introduction.

BRIEF SUMMARY OF THE INVENTION

In accordance with the invention, this is solved in that in the pilot's position there is provided at least one controlling element which the pilot can actuate, for controlling the aircraft, wherein the trailing edge of the flexible wing can be locally raised and/or lowered by means of a transmission means leading from the controlling element(s) to the trailing edge.

Cables are also provided in DE 36 02 407, which engage with the trailing edge of the aircraft. These cables, however, are only joined to one another, and only the tension of the connecting cables can be adjusted by the pilot (even during the flight). Active steering of the hang-glider disclosed therein is therefore not possible as the cables are not carried to any steering control elements. Steering is done in this case by means of weight shifting.

By means of the transmission means which—as will be described hereinafter—can include control cables and/or control rods, it is possible for the pilot to locally raise or respectively lower the trailing edge of the flexible wing from the pilot's position, and thereby to obtain a rudder steering effect. In a manner different to what is normal with aircraft, the rudders do not have to be configured from special components which are mounted in an articulated manner. Rather, it is sufficient to "deform" or respectively to warp the flexible wing by means of the transmission means (control cables and/or control rods) in order to obtain the desired rudder steering effect.

A further aspect of the invention relates to the reinforcement of the trailing edge of the wing by means of at least a stiffened elongate element, in particular a spar. This spar contributes on the one hand to the stability of the trailing edge of the aircraft, and thereby to improvement of the flying characteristics, and can, on the other hand, serve as a point of engagement for the controlling transmission means.

With hang-gliders, the height control and respectively control of the air speed is generally done by shifting weight forwards or respectively rearwards, wherein a weight shift forwards leads to an increase in speed (rapid flight), and a weight shift to the rear to a decrease in speed (slow flight). The transmission means according to the invention can be used not only for curving flight (rudder effect), but also virtually as an elevator, when the trailing edges are moved substantially in the same direction upwards or respectively downwards, in order to obtain upwards or respectively downwards control.

A variation is particularly advantageous which has a single control column, which can advantageously be movable in the manner of a joystick. For increasing speed, the control column is moved forwards, which, via the transmission means causes the two areas of the trailing edges of the flexible wing, to the left and right of the longitudinal central plane, to be pushed downwards. For decreasing speed, the control column is pulled back, whereby these areas of the trailing edges to the left and right move in the same direction upwards. For curving flight, the control column is moved to the left or respectively to the right, whereby the trailing edges are moved unevenly, which initiates curving flight.

Further advantages and details of the invention are explained in more detail with reference to the following description of the drawings.

BRIEF DESCRIPTION OF THE SEVERAL VIEWS OF THE DRAWINGS

FIG. 6 shows an embodiment in which the transmission means is carried in the wing, wherein the frame which is employed in shown enlarged in detail in FIG. 7, FIG. 8 again shows schematically the carrying of the cables via a guide point provided above the wing to the pilot's foot.

FIGS. 14a to 14d show different positions of the control column of FIG. 14,

DETAILED DESCRIPTION OF THE INVENTION

Figure 1:
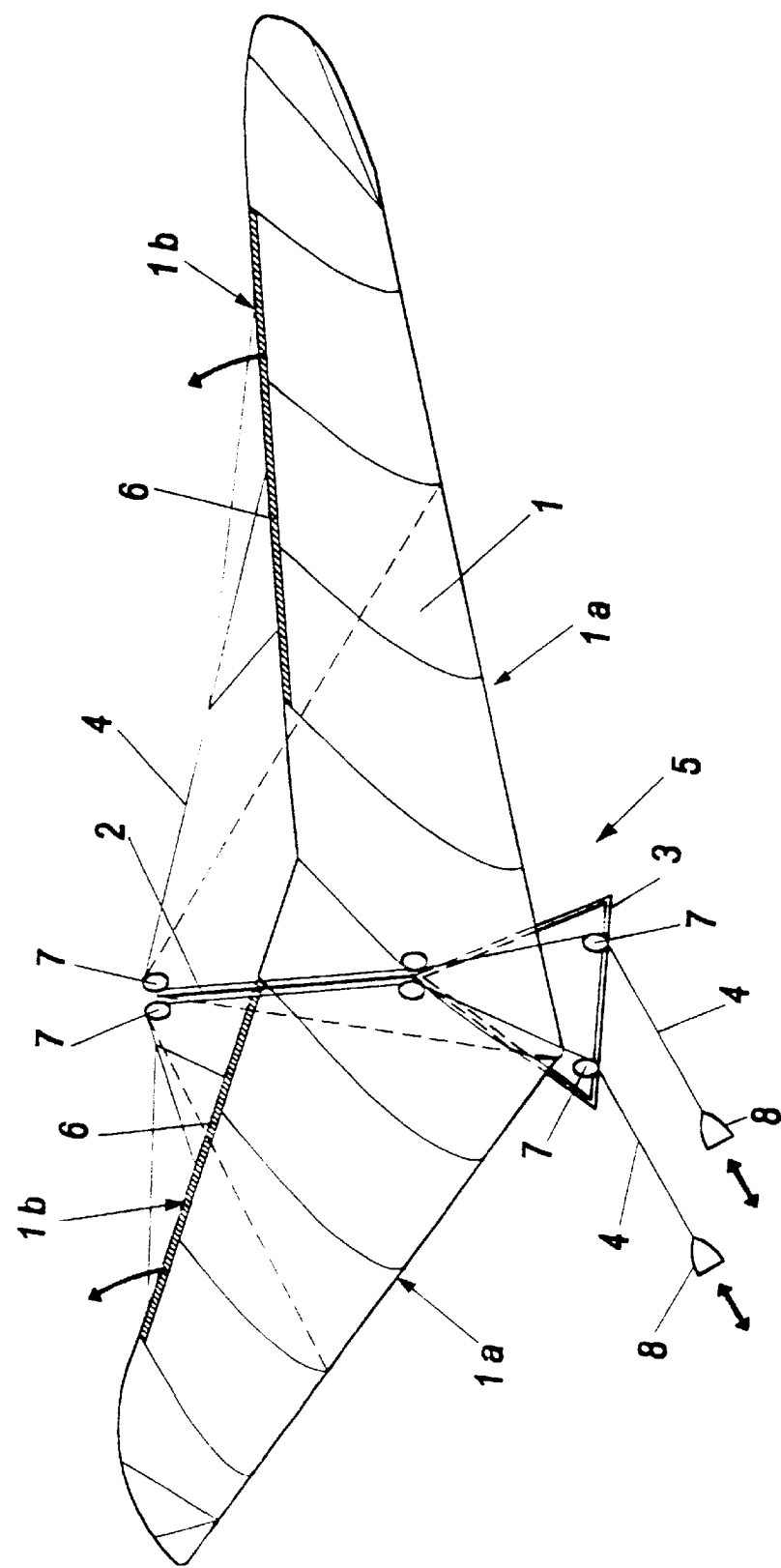
FIG. 1 shows, in a schematic perspective view, an embodiment of an aircraft according to the invention.

The hang-glider shown in FIG. 1 has a wing, generally referenced 1, of flexible material, which extends rearwards from a wing nose 1a supported by a frame. The supporting frame of the hang-glider also includes an upwardly projecting kingpost 2, as well as a triangular control frame 3 for the pilot. Bracing cables present between these elements are not the subject-matter of the invention, and are therefore not shown for reasons of clarity.

In accordance with the invention, a transmission means composed of control cables 4 is provided, by means of which the trailing edges 1b of the wing can be raised locally from the pilot's space, generally referenced 5, beneath the wing, in order to steer the aircraft, or respectively to support normal steering by means of weight shifting.

The control cables 4 engage with the segment 6, shown bold in FIG. 1, on the trailing edge 1b of the wing 1. These spars can, for example, be sewn into the flexible textile material of the wing, on the trailing edge. They extend respectively to the left and right along the central plane of the wing, over only the part of the length of the trailing edge 1b visible in FIG. 1.

The control cables 4 are carried over guide rollers 7, two of which are arranged at the top on the kingpost 2. By pulling on the loops 8, the pilot can move the left and respectively the right-hand trailing edge of the aircraft upwards, and consequently cause steering.

Figure 2A:
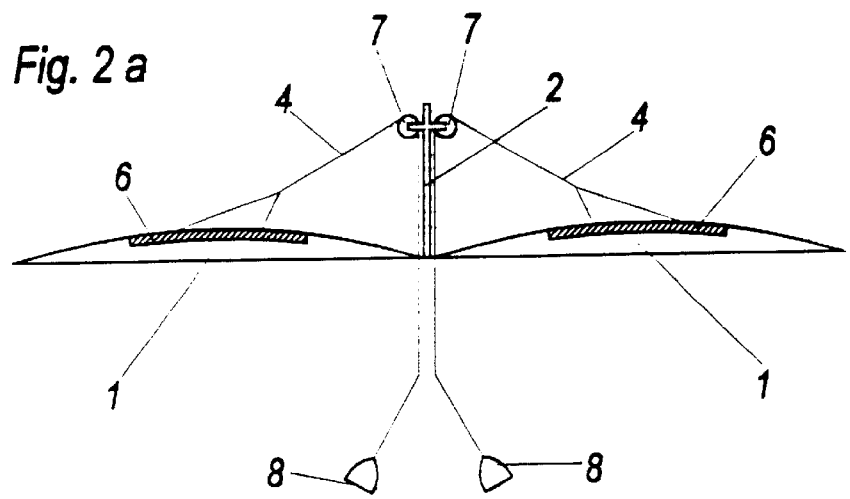
FIGS. 2a, 2b and 2c show, in a schematic view from the front, different flying and respectively steering states of this aircraft.
Figure 2B:
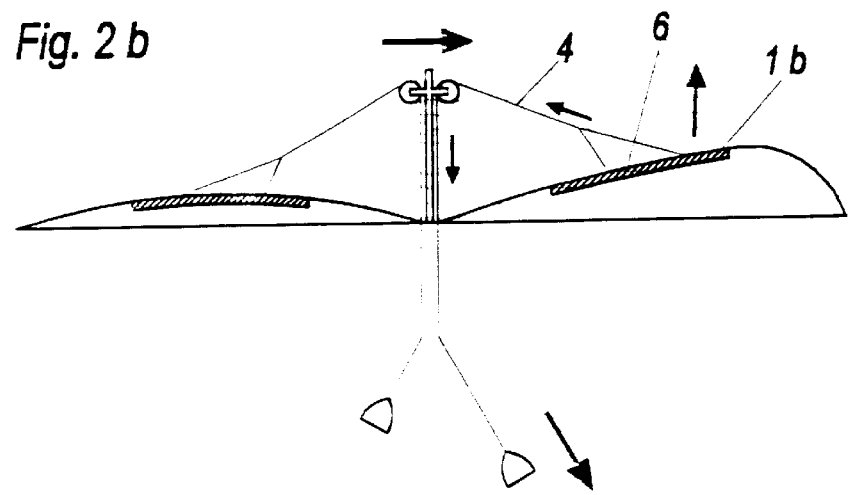
Figure 2C:
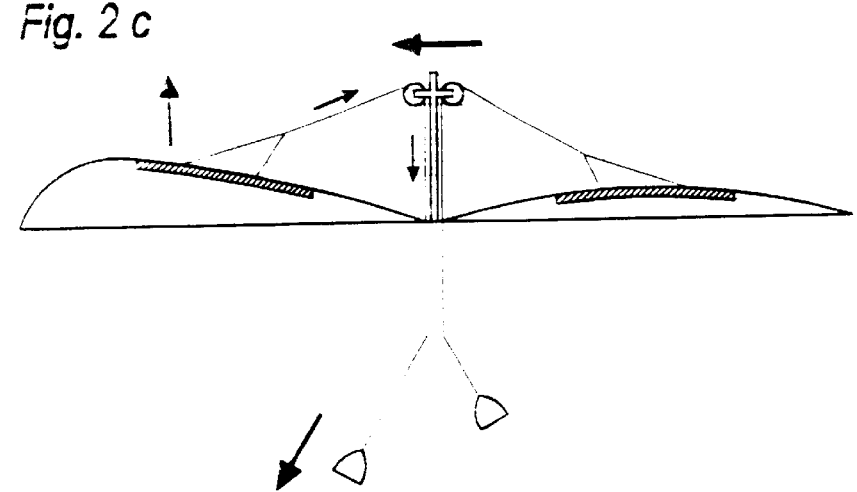

Steering and respectively straight-ahead flying is shown in FIGS. 2a, 2b and 2c. FIG. 2a shows the aircraft flying straight ahead, the two control cables 4 are not actuated, the two halves of the wing to the left and right of the centre plane are symmetrical. By pulling on the control cable 4, on the right in FIG. 2b, the trailing edge 1b of the wing and respectively the spar 6 arranged there is pulled upwards, whereby a rudder effect occurs and the aircraft steers. FIG. 2c shows flight in an opposite curve. The embodiment shown in FIGS. 3a and 3b is a hang-glider without an upwardly projecting kingpost, the control cables 4 provided as a transmission means are carried underneath and over guide rollers 7 on the control frame 3 for the pilot.

Figure 3:
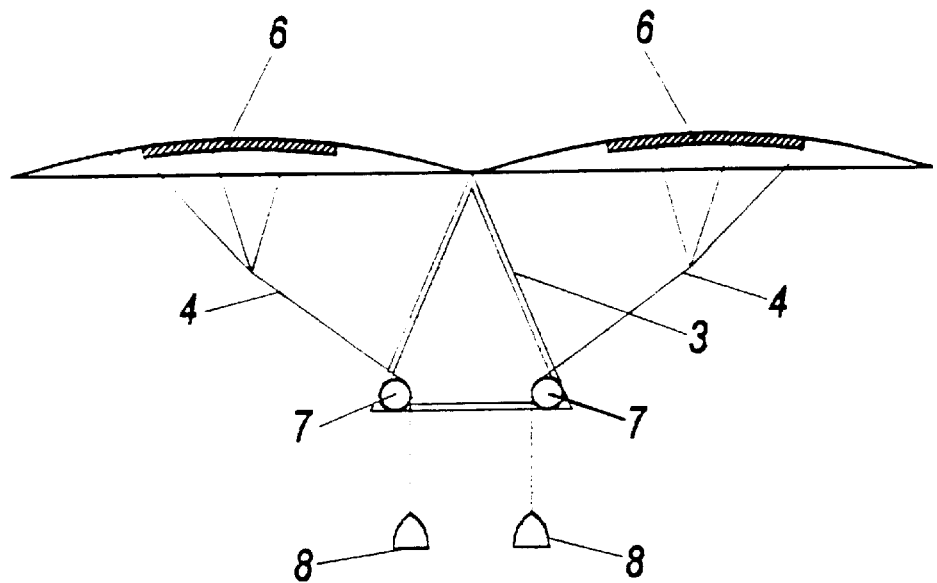
FIGS. 3a and 3b show alternative versions of the transmission means in two different flying states, without a kingpost, in which the transmission means is carried beneath the wing to the pilot's position.
Figure 3:
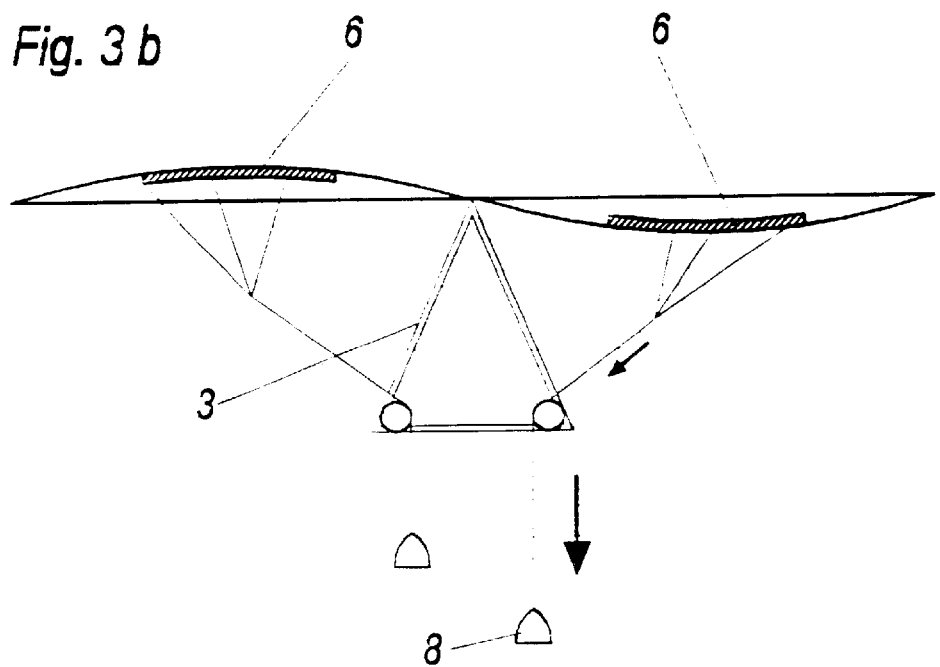

FIG. 3a shows straight-ahead flight, FIG. 3b flying in a curve, wherein the trailing edge on the right in FIG. 3b is pulled down by the pilot pulling on the right-hand stirrup 8.

Figure 4:
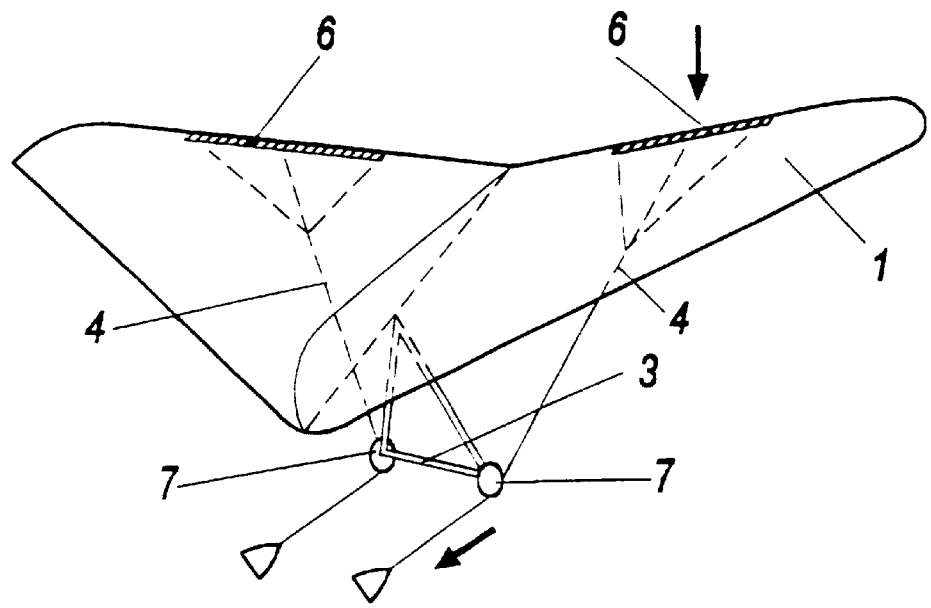
FIGS. 4 and 5 show further embodiments without a kingpost, in which the transmission system is carried beneath the wing to the pilot's position.
Figure 5:
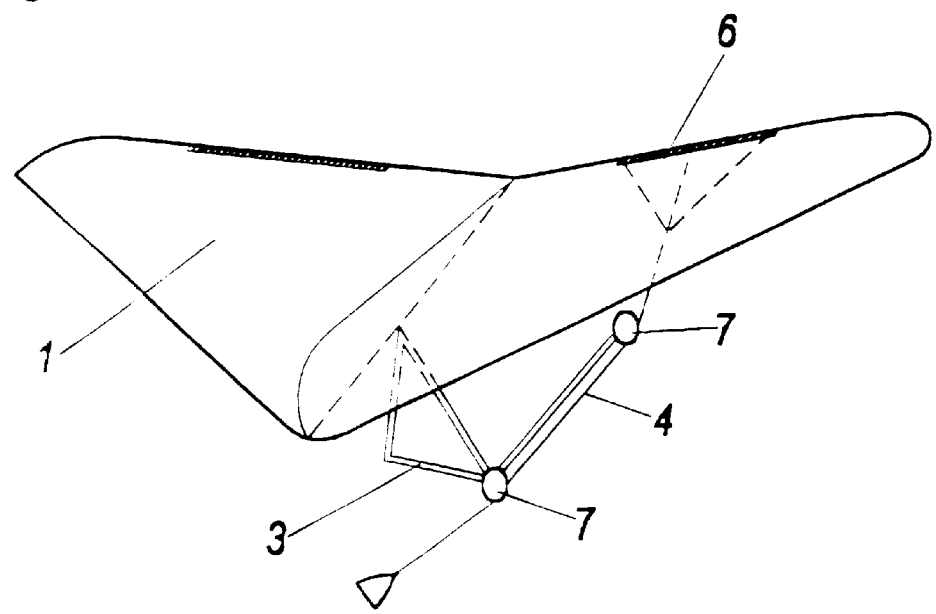

FIG. 4 shows a hang-glider as is shown in FIGS. 3a and 3b, in a perspective view, wherein it is evident that the control cables 4 are carried over guide rollers 7 on the control frame 3. In FIG. 5 an alternative is shown, in which the control cable 4 is not only carried over a guide roller 7 on the control frame 3, but also over an additional roller 7' which, for example, can be arranged on a lower lateral bracing for the wing which is not shown in more detail. The control cable 4 can be carried at a larger angle to the spar 6 via this guide roller 7', and thereby the trailing edge 1b of the aircraft can be more effectively pulled down and/or guided along the lateral bracing present.

FIGS. 6 and 7 show that the transmission means can largely be integrated into the wing itself. With this, in the present embodiment, a rod 10 is pivotably mounted on the frame 9, which rod is provided with a first lever 11 and a second lever 12 connected in a torsion resistant manner. The control cable 4 engages with the first lever 11, which cable leads to the pilot's position, and is provided on the end with a control frame or a control loop. The second lever 12 engages directly or indirectly with the rod 6. When the cable 4 is pulled via the control frame 8, the rod 10 pivots counter-clockwise and thereby takes the lever 12 upwards with it. In this way the trailing edge 1b, in the area of the rod 6, also moves upwards (arrow 13), whereby the desired rudder and steering effect is initiated.

Figure 8:
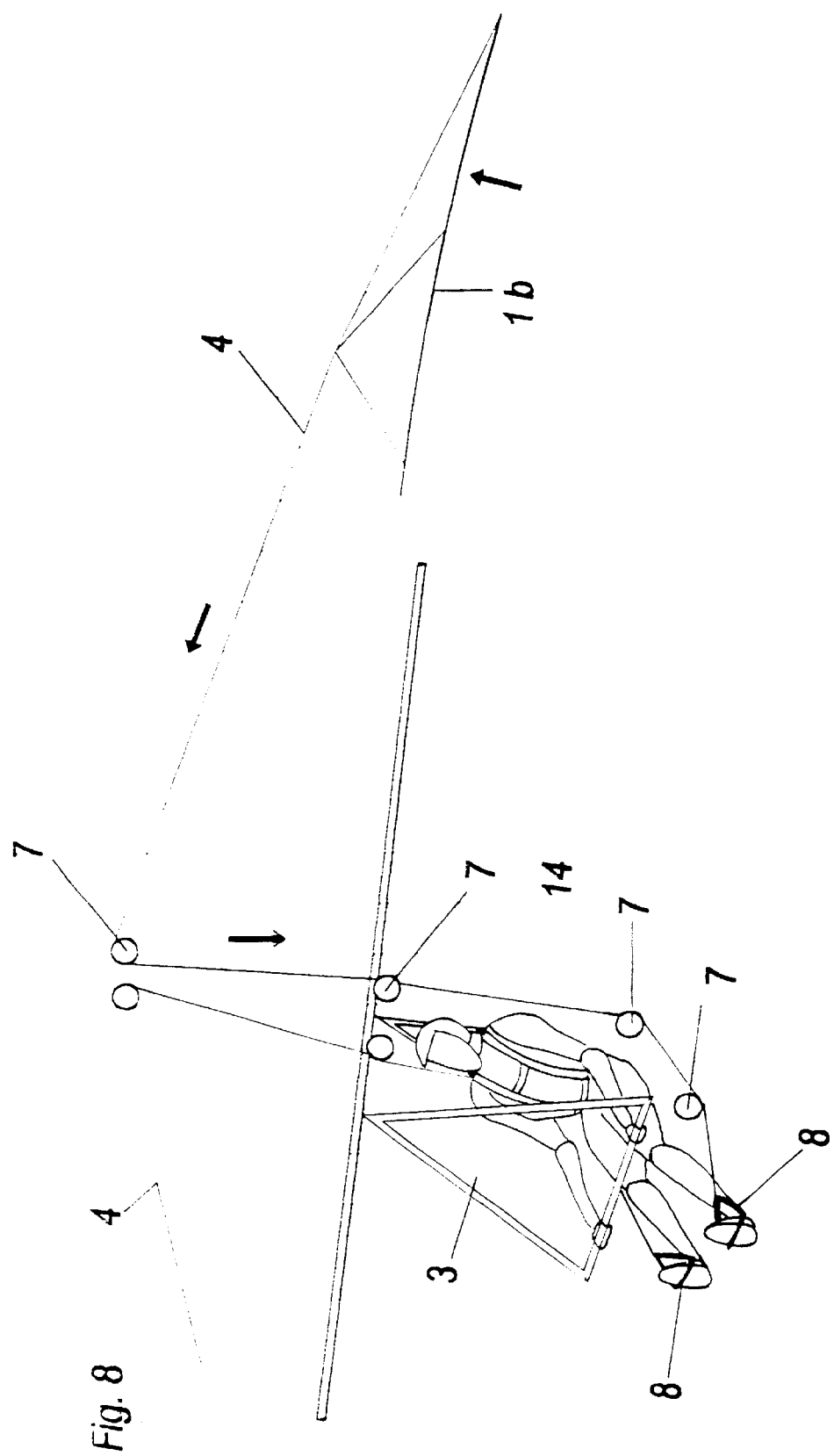

FIG. 8 again shows schematically a pilot 14 sitting beneath the hang-glider, holding the control frame 3 with his hands. The stirrups or respectively loops 8 on the end of the control cables 4 are connected to the feet of the pilot, and he can thus move the "aileron" by lifting the trailing edge 1b of the wing. Moreover, a further elevator function is also possible in addition to or alternatively to the control frame.

Figure 9:
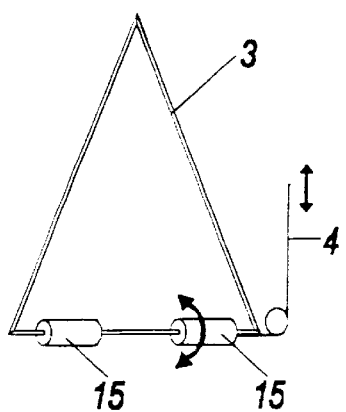
FIGS. 9, 10, 11 and 12 show possibilities for control by means of the pilot's hands.

FIGS. 9 to 13 show alternative means, by means of which the pilot can actuate the control cables 4:

In the embodiment shown in FIG. 9, rotatably mounted grips 15 are located on the control frame 3, which grips are configured such that their rotary movement is converted into a pulling movement on the control cable 4.

Figure 10:
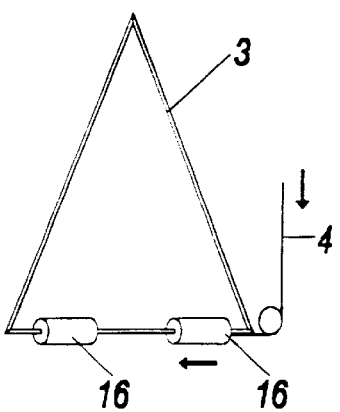

In the embodiment shown in FIG. 10, the grips 16 are mounted in a moveable manner, in order to be able to exert a direct pull on the control cable 4.

Figure 11:
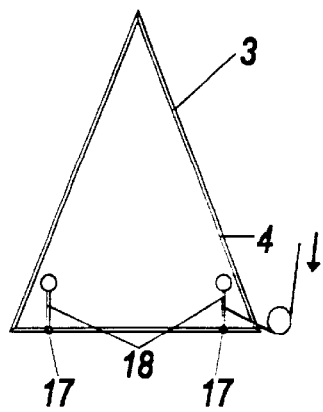

In the embodiment shown in FIG. 11, levers 18 pivotable about axles 17 are located on the control frame 3, onto which levers the control cables 4 are attached. By pivoting these control levers, the desired steering effect can be obtained by means of the control cables.

Figure 12:
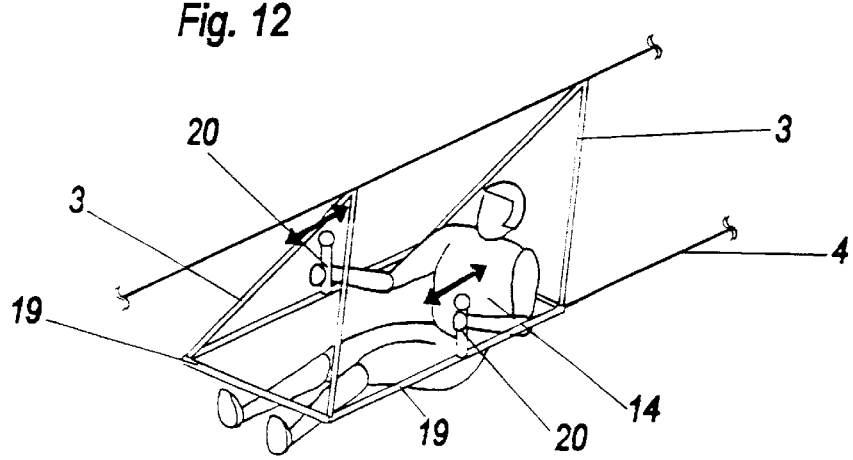

In the embodiment shown in FIG. 12, moveable or respectively tiltable control levers 20 are also provided for the seated pilot 14 on a double control frame 13 or respectively on its longitudinal rods 19, which levers act directly or via guide mechanisms upon the control cables 4.

Figure 13:
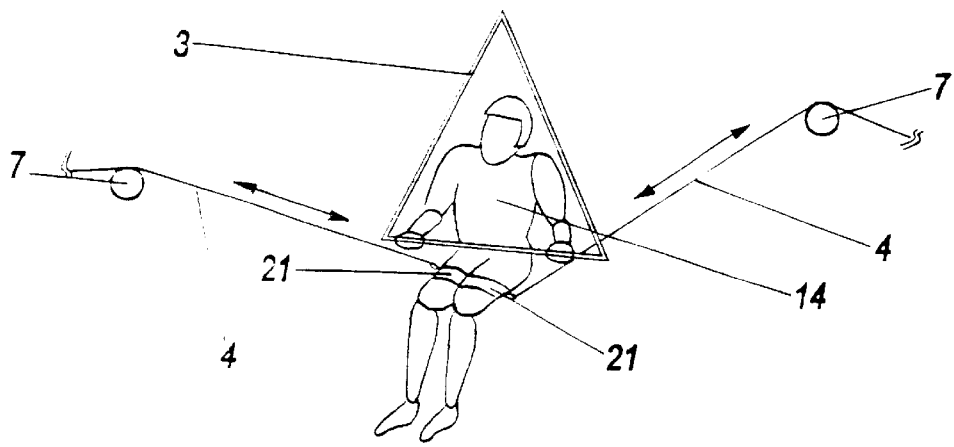
FIG. 13 shows a possibility for control by shifting the body.

In the embodiment shown in FIG. 13 the steering is done in that the control cable 4 is affixed to the body of the pilot, whereby steering is initiated automatically by shifting the body. The attachment of the cables 4 to the pilot can, for example, be done on the seat strap arrangement 21.

Figure 14:
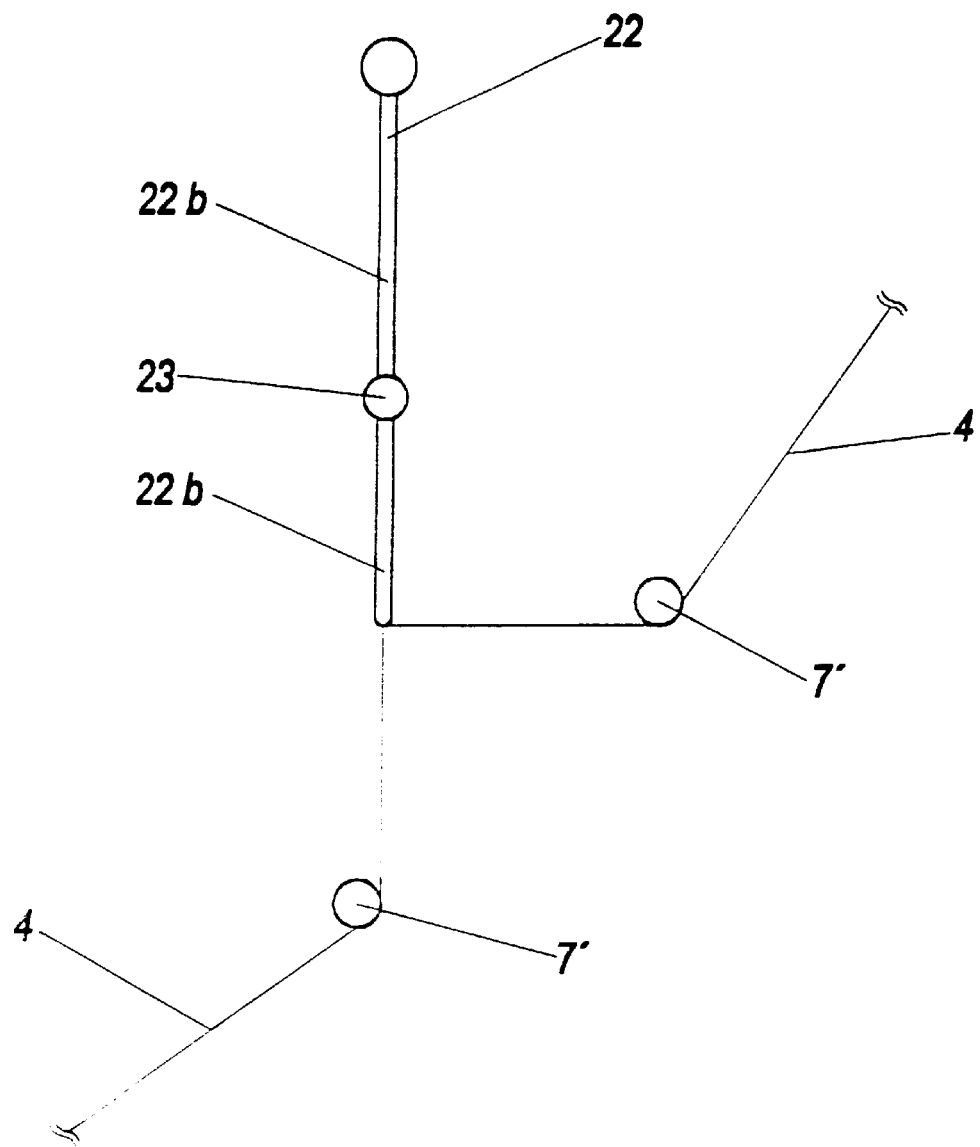
FIG. 14 shows an embodiment of a single control element in the form of a control column, wherein the control cables leading to the trailing edges of the flexible wing are only shown in part. They can also run, for example, in the manner shown in FIG. 1.
Figure 14:
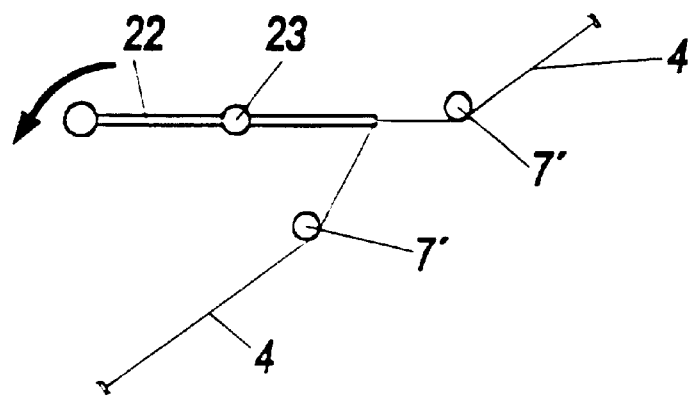
Figure 14:
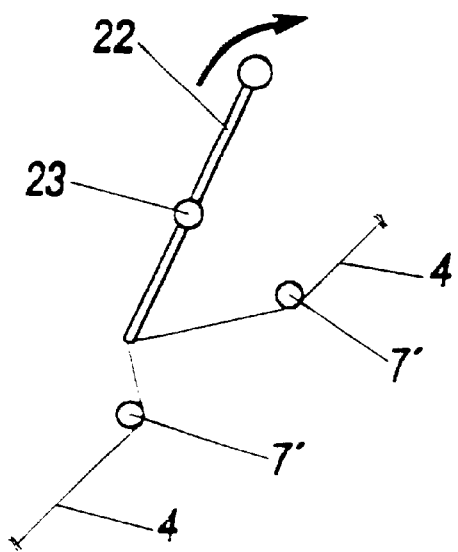
Figure 14:
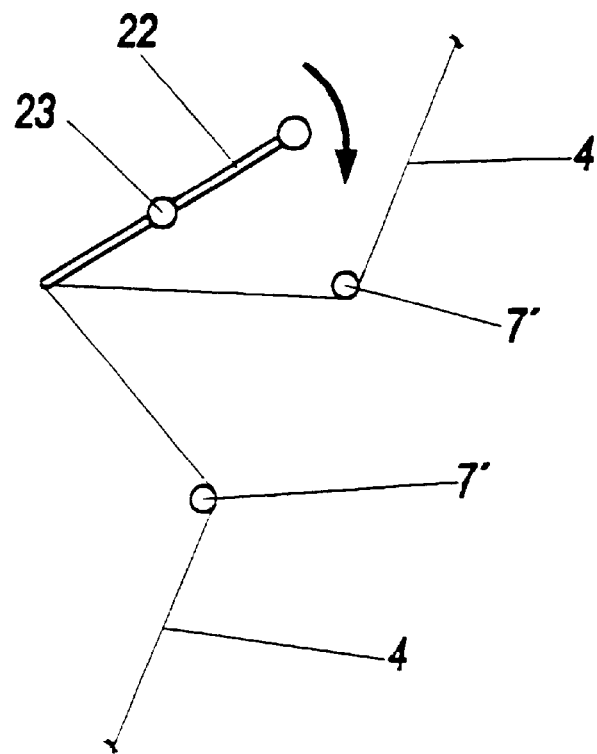
Figure 14:
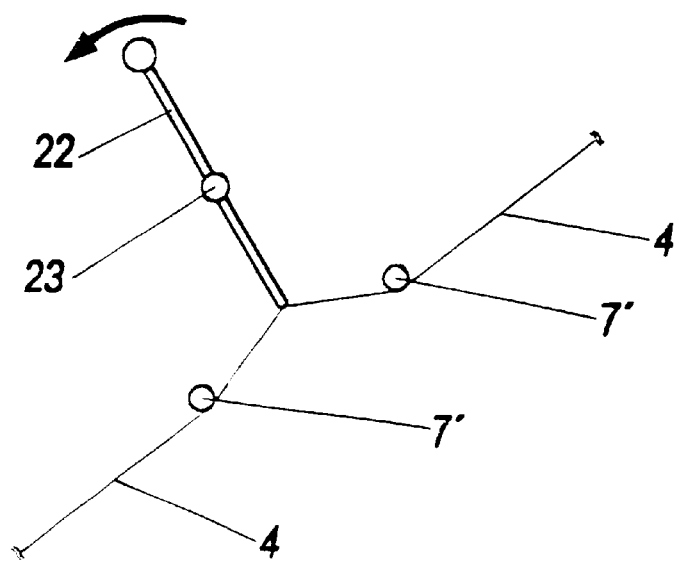

In FIG. 14 a control element in the form of a control column 22 is provided, which is gimbal mounted, or in the manner of a universal joint, on a pivot 23 fixed to the aircraft. The control column can thus be moved in the manner of a joystick in different directions. It is configured as a two-armed lever, wherein one arm 22a is used by the pilot, while at the end of the other arm 22b, the control cables 4 which run to the trailing edges of the wing, which are not shown, are attached. One control cable 4 runs to the right-hand trailing edge, the other control cable 4 to the left-hand trailing edge, respectively via guide rollers 7', which are arranged in the proximity of the control column 22. The remaining running of the control cables over guide rollers or respectively guideways can be, for example, as shown in FIG. 1.

Figure 15A:
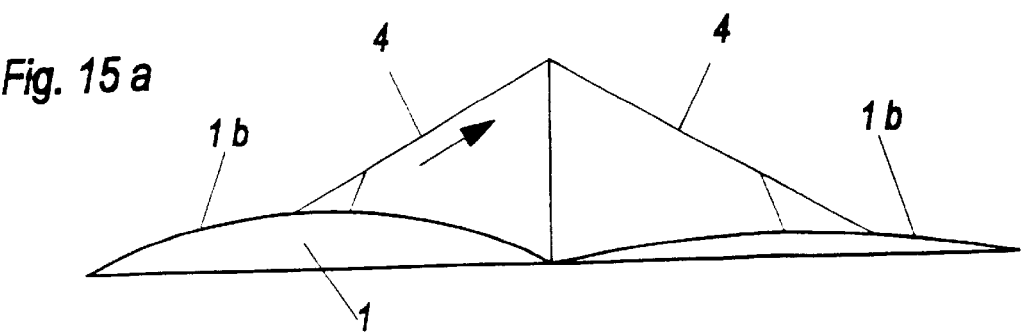
FIGS. 15a to 15d show schematically the loadings of the trailing edges of the flexible wing according to the control column position in one of FIGS. 14a to 14d.
Figure 15B:
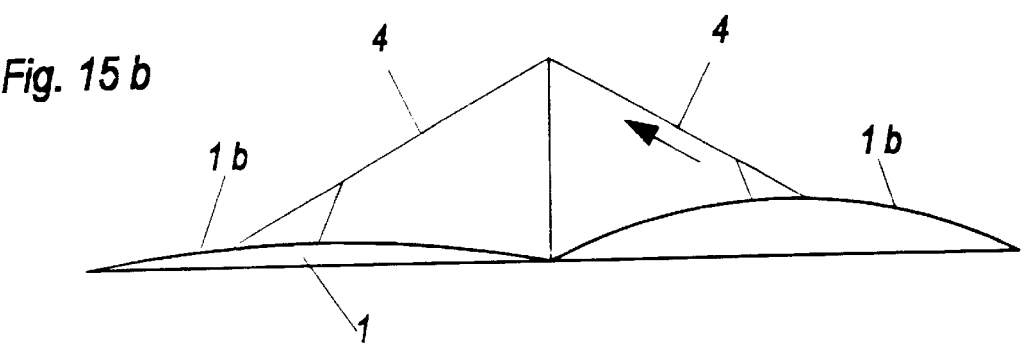

With the control column of FIG. 14 different flying functions can be produced, as is shown in FIGS. 14a to 14d. A movement of the control column to the left, as is shown in FIG. 14a, produces a curve to the left, as the trailing edges 1b of the wing 1 with respect to the longitudinal central plane can be different pulled up and respectively lowered down as is shown in FIG. 15a. The same applies with respect to FIGS. 14b and 15b for a right-hand curve, in which the control column 22 is moved to the right.

Figure 15C:
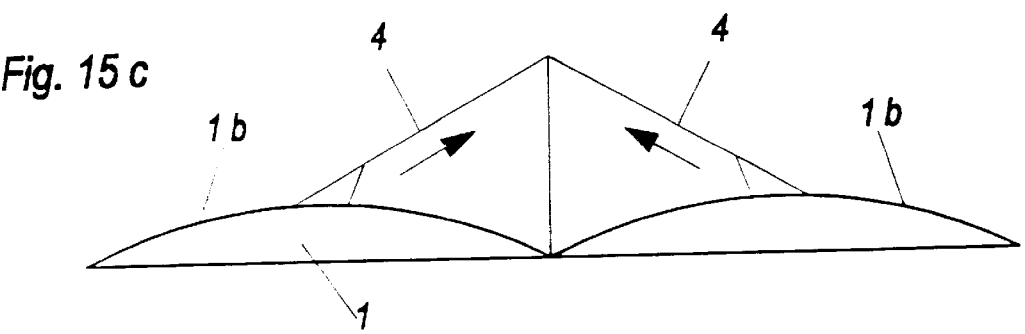
Figure 15D:
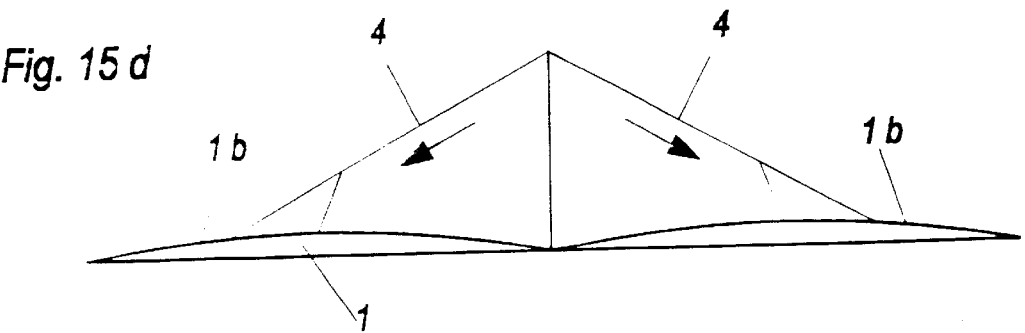

The lever 22 can, however, also be used for simple height control, when it is moved straight backwards or forwards, as shown by FIGS. 14c and 14d. This produces a lifting or respectively a lowering in the same direction of the trailing edges 1b, as is shown in FIGS. 15c to 15d. Naturally, the lever 22 can also be put into a "combination position", for example, diagonally forward to the right, which means a right-hand curve and transition to rapid flight.

What is claimed is:

1. An aircraft with a flexible wing and a pilot's position, from which the aircraft can be controlled, wherein in said pilot's position at least one control element actuated by a pilot is provided for controlling said aircraft, characterized in that at least one trailing edge of the flexible wing is stiffened at least along a section of the trailing edge and can be locally raised or lowered by a transmission leading from the at least one control element to and being engaged substantially with said stiffened section of said trailing edge.

2. An aircraft according to claim 1, wherein said at least one elongate stiffened section of said at least one trailing edge of said flexible wing extends substantially at a right angle to a direction of flight.

3. An aircraft according to claim 1, wherein said at least one elongate stiffened section of said at least one trailing edge of said flexible wing is arranged preferably symmetrically to a left and a right side of a longitudinal central plane of said aircraft.

4. An aircraft according to claim 2, wherein said at least one trailing edge of said flexible wing is stiffened along at least more than half of its elongate extension.

5. An aircraft according to claim 2, wherein said at least one stiffened section of said at least one trailing edge of said flexible wing has at least several layers of material.

6. An aircraft according to claim 2, wherein said at least one stiffened section of said at least one trailing edge of said flexible wing has at least one separate stiffening element, for example a stiffening spar.

7. An aircraft according to claim 2, wherein said at least one stiffened section of said at least one trailing edge of said flexible wing has at least several layers of material and at least one separate stiffening element, for example a stiffening spar.

8. An aircraft according to claim 1, wherein said transmission includes at least two control cables by means of which areas of said trailing edge of said wing being arranged preferably symmetrically to a left and a right side of the longitudinal central plane of said aircraft can be pulled upwards and respectively downwards.

9. An aircraft according to claim 8, wherein said control cables are carried respectively over at least one guide point lying above or below the wing, and from said at least one guide point to said trailing edge of said wing.

10. An aircraft according to claim 9, wherein at least one of said guide points are arranged on a kingpost projecting upward centrally above said wing.

11. An aircraft according to claim 1, wherein at said pilot's position, a single control element which—proceeding from a neutral element—with a movement forwards or rearwards, moves areas of said trailing edge of said wing lying to a left and a right side of the central longitudinal plane of said aircraft in the same direction by said transmission downwards or respectively upwards, and which when moved to the left or right moves said areas of said trailing edges of the flexible wing lying to the left and right of said central longitudinal plane of said aircraft oppositely upwards or respectively downwards for curved flight.

12. An aircraft according to claim 11, wherein said single control element is a gimbal mounted lever mounted on a point fixed to said aircraft.

13. An aircraft according to claim 11, wherein said single control element is a universal joint mounted lever mounted on a point fixed to said aircraft.

14. An aircraft according to claim 12, wherein said lever is configured with two ends, wherein a first end represents an actuating handle for said pilot, and on a second end said transmission is attached.

15. An aircraft according to claim 13, wherein said lever is configured with two ends, wherein a first end represents an actuating handle for said pilot, and on a second end said transmission is attached.

16. An aircraft according to claim 1, wherein said aircraft is a hang-glider.

* * * * *